(12) United States Patent
Basso et al.

(10) Patent No.: US 7,036,125 B2
(45) Date of Patent: Apr. 25, 2006

(54) ELIMINATING MEMORY CORRUPTION WHEN PERFORMING TREE FUNCTIONS ON MULTIPLE THREADS

(75) Inventors: Claude Basso, Raleigh, NC (US); Matthew William Kilpatrick Brown, Durham, NC (US); Gordon Taylor Davis, Chapel Hill, NC (US); Marco Heddes, Lawrence, MA (US); Piyush Chunilal Patel, Cary, NC (US); Grayson Warren Randall, Cary, NC (US); Sonia Kiang Rovner, Chapel Hill, NC (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 10/217,529

(22) Filed: Aug. 13, 2002

(65) Prior Publication Data
US 2004/0032867 A1    Feb. 19, 2004

(51) Int. Cl.
*G06F 9/46* (2006.01)
*G06F 12/00* (2006.01)

(52) U.S. Cl. ............... 718/104; 711/152; 711/163; 709/223; 709/224

(58) Field of Classification Search ............ 718/100, 718/102, 104, 107, 101, 103; 709/201, 203, 709/223, 224, 204, 217, 219, 220; 711/152, 711/155, 163, 104, 105, 154
See application file for complete search history.

(56) References Cited

U.S. PATENT DOCUMENTS

| | | | | |
|---|---|---|---|---|
| 5,499,356 A | * | 3/1996 | Eckert et al. | 711/152 |
| 5,761,670 A | * | 6/1998 | Joy | 707/103 R |
| 5,872,980 A | | 2/1999 | Derrick et al. | 395/726 |
| 5,881,269 A | | 3/1999 | Dobbelstein | 395/500 |
| 5,956,507 A | * | 9/1999 | Shearer et al. | 718/104 |
| 6,012,061 A | | 1/2000 | Sharma | 707/100 |
| 6,026,427 A | | 2/2000 | Nishihara et al. | 709/106 |

(Continued)

FOREIGN PATENT DOCUMENTS

EP    1008934 A2    12/1999

(Continued)

OTHER PUBLICATIONS

"Microkernel Semaphores," *IBM Technical Disclosure Bulletin*, vol. 38, No. 7, Jul. 1995, pp. 111-117.

(Continued)

*Primary Examiner*—Majid A. Banankhah
(74) *Attorney, Agent, or Firm*—Robert A. Voigt, Jr.; Winstead Sechrest & Minick P.C.

(57) ABSTRACT

A method, system and computer program product for eliminating memory corruption when performing multi-threaded tree operations. A network processor may receive a command to perform a tree operation on a tree on one or more of multiple threads. Upon performing the requested tree operation, the network processor may lock one or more resources during a portion of the execution of the requested tree operation using one or more semaphores. A semaphore may refer to a flag used to indicate whether to "lock" or make available the resource associated with the semaphore. Locking may refer to preventing the resource from being available to other threads. Hence, by locking one or more resources during a portion of the tree operation, memory corruption may be eliminated in a multiple thread system while preventing these resources from being used by other threads for a minimal amount of time.

27 Claims, 8 Drawing Sheets

U.S. PATENT DOCUMENTS

| | | | | |
|---|---|---|---|---|
| 6,029,190 | A | 2/2000 | Oliver | 709/107 |
| 6,122,713 | A | 9/2000 | Huang et al. | 711/147 |
| 6,125,401 | A | 9/2000 | Huras et al. | 709/300 |
| 6,131,094 | A | 10/2000 | Gord | 707/8 |
| 6,199,094 | B1* | 3/2001 | Presler-Marshall | 718/104 |
| 6,237,019 | B1 | 5/2001 | Ault et al. | 709/104 |
| 6,247,025 | B1* | 6/2001 | Bacon | 707/206 |
| 6,260,042 | B1 | 7/2001 | Curbera et al. | 707/101 |
| 6,272,519 | B1* | 8/2001 | Shearer et al. | 718/104 |
| 6,282,637 | B1* | 8/2001 | Chan et al. | 712/223 |
| 6,519,623 | B1* | 2/2003 | Mancisidor | 718/100 |
| 6,529,933 | B1* | 3/2003 | Montgomery et al. | 718/102 |
| 6,687,735 | B1* | 2/2004 | Logston et al. | 709/203 |
| 6,738,974 | B1* | 5/2004 | Nageswaran et al. | 718/104 |
| 6,823,511 | B1* | 11/2004 | McKenney et al. | 718/102 |
| 6,883,026 | B1* | 4/2005 | Onodera et al. | 709/223 |
| 6,941,341 | B1* | 9/2005 | Logston et al. | 709/203 |
| 2001/0034753 | A1 | 10/2001 | Hildebrand et al. | 709/107 |

FOREIGN PATENT DOCUMENTS

EP    1008934 A2    12/1999

OTHER PUBLICATIONS

"Microkernel Synchronization Primitives," *IBM Technical Disclosure Bulletin*, vol. 38, No. 5, May 1995, pp. 283-289.

Donald R. Morrison. "PATRICIA—Practical Algorithm To Retrieve Information Coded in Alphanumeric," *Journal of the Association for Computing Machinery*, vol. 15, No. 4, Oct. 1968, pp. 514-534.

"Microkernel Semaphores," IBM Technical Disclosure Bulletin, Vol. 38, No. 7, Jul. n1995, pp. 111-117.

"Microkernel Synchronization Primitives," IBM Technical Disclosure Bulletin, Vol. 38, No. 5, May 1995, pp. 283-289.

Donald R. Morrison, "PATRICIA—Practical Algorithm To Retrieve Information Coded in Alphanumeric," *Journal of the Association for Computing Machinery*, Vol. 15, No. 4, Oct. 1968, pp. 514-534.

* cited by examiner

ELIMINATING MEMORY CORRUPTION WHEN PERFORMING TREE FUNCTIONS ON MULTIPLE THREADS

TECHNICAL FIELD

The present invention relates to the field of packet switching networks, and more particularly to eliminating memory corruption when performing multi-threaded tree functions, e.g., insert leaf, update leaf, read leaf, delete leaf.

BACKGROUND INFORMATION

A packet switching network has switching points or nodes (commonly referred to as switches or routers) for transmissions of data among senders and receivers connected to the network. The switching performed by these switching points is in fact the action of passing on packets of data received by a switching point or node to a further node in the network. Such switching actions are the means by which communication data is moved through the packet switching network.

Each switch or router may comprise what is commonly referred to as a "control point" coupled to one or more processors commonly referred to as network processors. Network processor(s) may be configured to process packets of data. The control point may be a processor configured to manage the overall operation of the switch or router. For example, the control point may be configured to initialize network processor(s), download boot or diagnostic code, install operational code on the network processor(s) as well as transmit frames, i.e., packets of data, to network processor(s), to perform particular operations on a tree, e.g., insert leaf, update leaf, read leaf, delete leaf, as discussed in further detail below.

These frames or packets of data transmitted to the network processor(s) from the control point may comprise commands to perform a particular operation on a tree, e.g., insert leaf, update leaf, read leaf, delete leaf, as discussed in further detail below. A tree may refer to a conceptual or graphical representation of data organized in a tree structure. A leaf may refer to the end node of a tree storing data, e.g., next hop address. These frames may further comprise a tree identifier, a key such as a 32-bit binary number used to search the tree and leaf data (if any). The network processor may use a portion of the bits of the key, e.g., 16 most significant bits, to index into an entry in a table commonly referred to as a direct table. The direct table may comprise entries storing either a leaf or an address of a first node of a tree structure. Each node in a tree may commonly be referred to as a Pattern Search Control Block (PSCB). If the entry indexed into the direct table is a PSCB, then the remaining bits of the key, e.g., 16 least significant bits, that are not used for indexing into the direct table, may be used to traverse the tree to locate the leaf. That is, the remaining bits of the key, e.g., 16 least significant bits, may be used to locate the leaf. Upon locating the leaf, the network processor executes the received command, e.g., read the leaf, delete the leaf, update the leaf using the received leaf data, insert the leaf data using the received leaf data.

As stated above, a tree may refer to a conceptual or graphical representation of data organized in a tree structure. The tree structure may comprise a starting point commonly referred to as a root that is connected to other points in the tree structure commonly referred to as nodes. Each of these nodes may be connected to other nodes thereby forming "branches." As stated above, the node at the end of each branch may be referred to as a leaf.

Various tree operations or functions may be performed on the tree structure. For example, a function referred to as the "insert leaf" function may refer to inserting data at a particular leaf in a particular tree structure. The function referred to as the "update leaf" function may refer to updating the data associated with a particular leaf. The function referred to as the "read leaf" function may refer to reading the data associated with a particular leaf. The function referred to as the "delete leaf" function may refer to deleting a leaf from a particular tree structure.

Formerly, all tree operations such as the ones described above were executed serially on a single thread. However, performing tree operations serially on a single thread was slow and inefficient so tree operations started to be performed on multiple threads. However, when performing tree operations using multiple threads, memory corruption may occur. The tree operations described above may involve inserting and/or deleting nodes of the tree structure thereby modifying the tree structure. If multiple tree operations occur in a substantially concurrent manner, then inserts and/or deletes may occur in a substantially concurrent manner in the same region of the tree thereby resulting in inconsistent node updates.

It would therefore be desirable to eliminate memory corruption when performing multi-threaded tree functions, e.g., insert leaf, update leaf, read leaf, delete leaf.

SUMMARY

The problems outlined above may at least in part be solved in some embodiments by locking one or more resources, e.g., address of a leaf, direct table, list of available leaves to be used, list of available Pattern Search Control Block's (PSCB's) to be used, list of active leaves in a tree, during a portion of a tree operation, e.g., insert leaf, update leaf, read leaf, delete leaf, using one or more semaphores. A semaphore may refer to a software or hardware flag used to indicate whether to "lock" or make available the resource associated with the semaphore. Locking may refer to preventing the resource from being available to other threads in the system. Based on the value of a semaphore, the resource associated with that semaphore may be locked during a portion of the tree operation. During the remaining portion of the tree operation, the resource associated with that semaphore may be made available to other threads in the system. Hence, by locking one or more resources during a portion of the tree operation, memory corruption may be eliminated in a multiple thread system. Furthermore, by locking one or more resources for only a portion of the tree operation, these resources may be prevented from being used by other threads for a minimal amount of time.

In one embodiment of the present invention, a method for eliminating memory corruption when performing tree operations on multiple threads may comprise the step of a network processor in a router or switch receiving a command to perform a tree operation, e.g., leaf insert, leaf update, leaf read, leaf delete, on a particular tree. The command may be received from a control point in the router or switch. The network processor may further receive a tree identifier indicating a particular tree, a key and leaf data (if any) from the control point. The control point may refer to a processor in the router or switch configured to manage the overall operation of the switch or router.

Upon receiving the above information, the network processor may lock one or more resources, e.g., direct table, list of available leaves to be used, list of available PSCB's to be used, address of a leaf, list of active leaves in a tree, during a portion of the execution of the requested tree operation using one or more semaphores. A semaphore may refer to a software or hardware flag used to indicate whether to "lock" or make available the resource associated with the semaphore. Locking may refer to preventing the resource from being available to other threads in the system. Hence, by locking one or more resources during a portion of the execution of the tree operation, memory corruption may be eliminated in a multiple thread system. That is, by locking particular resources, e.g., direct table, list of available leaves to be used, list of available PSCB's to be used, list of active leaves in a tree, that may be subject to corruption if more than one tree operation were performed substantially in a concurrent manner, memory corruption may be eliminated. Furthermore, by locking these resources for only a portion of the duration of the tree operation, these resources may be prevented from being used by other threads for a minimal amount of time.

Upon completion of the execution of the requested tree operation by the network processor, the resources associated with the requested tree operation will be free to be used by other threads.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

It is noted that even though the description of the present invention describes eliminating memory corruption using a minimal number of semaphores during particular types of tree operations such as the leaf insert, leaf update, leaf read and leaf delete tree operations that the principles of the present invention may be used for any type of tree operation. It is further noted that embodiments eliminating memory corruption using the principles of the present invention during other types of tree operations not discussed would fall within the scope of the present invention.

Figure 1:
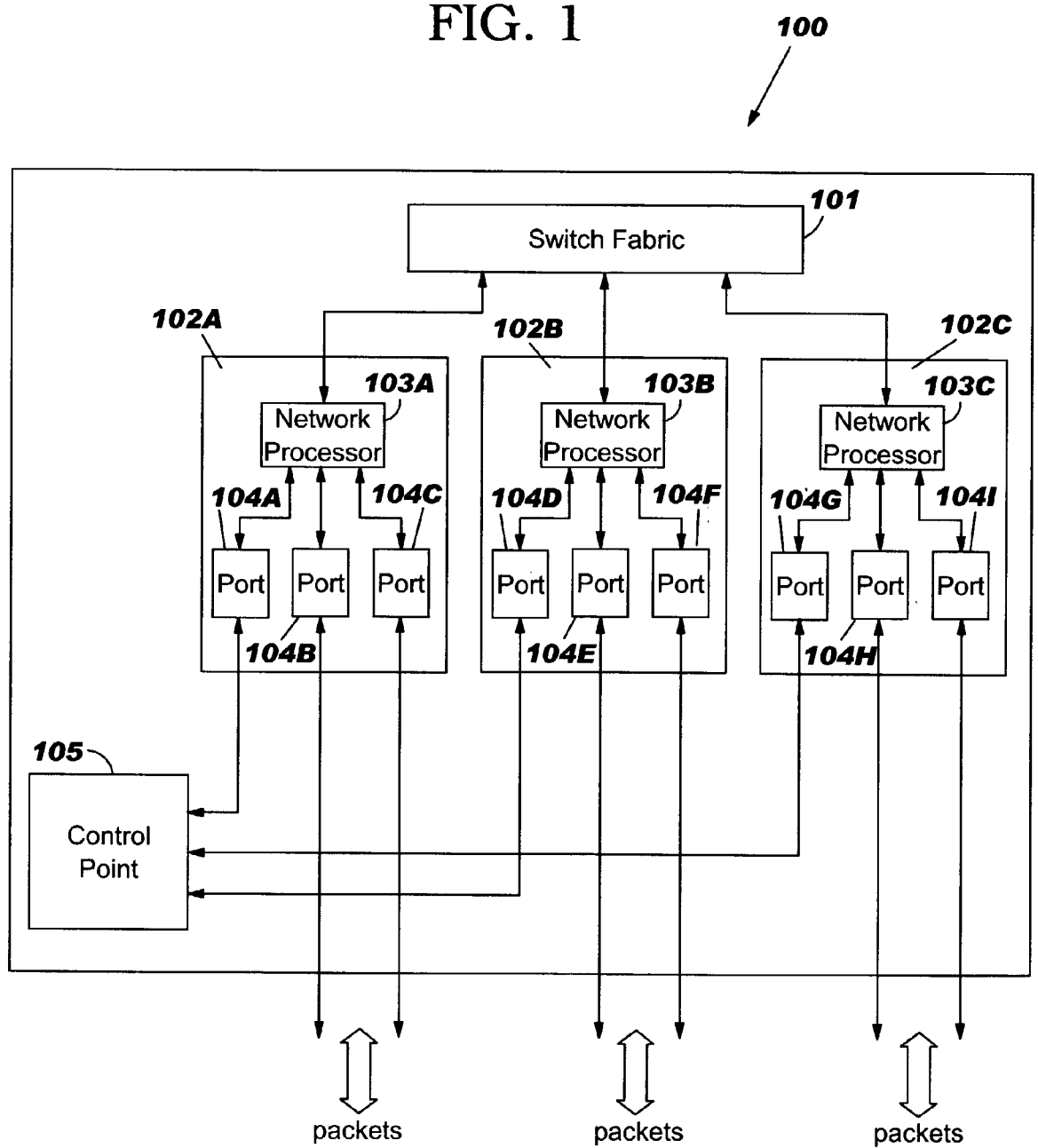
FIG. 1 illustrates a router in a network system configured in accordance with the present invention.

FIG. 1—Router in a Network System

FIG. 1 illustrates an embodiment of a router 100 in a network system. Router 100 may be configured to receive packets of data that may be directed to another particular router 100 in the network system. Router 100 may comprise a switch fabric 101 configured to switch packets of data among the various blades 102A–C coupled to switch fabric 101. Blade 102A may comprise a network processor 103A coupled with one or more ports 104A–C. Blade 102B may comprise a network processor 103B coupled with one or more ports 104D–F. Blade 102C may comprise a network processor 103C coupled with one or more ports 104G–I. Blades 102A–C may collectively or individually be referred to as blades 102 or blade 102, respectively. Network processors 103A–C may collectively or individually be referred to as network processors 103 or network processor 103, respectively. Ports 104A–I may collectively or individually be referred to as ports 104 or port 104, respectively. Each port 104 may be coupled to either a network device, e.g., gateway, server, router, in the network system or to a control point 105, e.g., processor, in router 100. Network processors 103 may be configured to receive packets of data to be processed from control point 105 or via ports 104 from network devices in the network system. It is noted that router 100 may comprise any number of blades 102 comprising any number of network processors 103 and ports 104 and that FIG. 1 is illustrative. It is further noted that any number of ports 104 may be coupled to a network device or to control point 105.

Referring to FIG. 1, control point 105 may be configured to manage the overall operation of router 100. For example, control point 105 may be configured to initialize network processor(s) 103, download boot or diagnostic code, install operational code on the network processor(s) 103 as well as transmit frames, i.e., packets of data, to network processor(s) 103 to perform particular operations on a tree, e.g., insert leaf, update leaf, read leaf, delete leaf. These frames of data may comprise commands to perform a particular operation on a tree, e.g., insert leaf, update leaf, read leaf, delete leaf. A tree may refer to a conceptual or graphical representation of data organized in a tree structure. A leaf may refer to the end node of a tree storing data, e.g., next hop address, to indicate what actions, e.g., modify packet, port to forward packet, network processor 103 should perform on the packet. These frames may further comprise a tree identifier indicating a particular tree, leaf data for certain tree operations, as well as a key, e.g., 32-bit binary number. Network processor 103 may use a portion of the bits of the key, e.g., 16 most significant bits, to access an entry in a table commonly referred to as a direct table. The direct table may comprise entries storing either a leaf or an address of the first node of a tree structure. Each node in the tree may commonly referred to as a Pattern Search Control Block (PSCB). If the entry indexed into the direct table is a PSCB, then the remaining bits of the key, e.g., 16 least significant bits, that are not used for indexing into the direct table, may be used to traverse the tree to locate the leaf. That is, the remaining bits of the key, e.g., 16 least significant bits, may be used to locate the leaf. Upon locating the leaf, network processor 103 executes the received command, e.g., read the leaf, delete the leaf, update the leaf using the received leaf data, insert the leaf data using the received leaf data.

As stated in the Background Information section, formerly, all tree operations, e.g., insert leaf, update leaf, read leaf, delete leaf, were executed serially on a single thread. However, performing tree operations serially on a single thread was slow and inefficient so tree operations started to be performed on multiple threads. However, when performing tree operations using multiple threads, memory corruption may occur. The tree operations described above may involve inserting and/or deleting nodes of the tree structure thereby modifying the tree structure. If multiple tree operations occur in a substantially concurrent manner, then inserts and/or deletes may occur in a substantially concurrent manner in the same region of the tree thereby resulting in inconsistent node updates. It would therefore be desirable to eliminate memory corruption when performing multi-threaded tree functions, e.g., insert leaf, update leaf, read leaf, delete leaf. A method for eliminating memory corruption when performing multi-thread tree functions, e.g., insert leaf, update leaf, read leaf, delete leaf, is discussed further below in conjunction with FIG. 2.

Referring to FIG. 1, network processor 103, e.g., network processor 103A, may be configured in one embodiment to comprise a memory (not shown), e.g., non-volatile memory, to store a program to perform the steps of the method for minimizing memory corruption when performing tree functions as described further below in conjunction with FIG. 2. The memory (not shown) in network processor 103 may further be configured to store a direct table, a list of available leaves to be used (commonly referred to as a "leaf free list"), a list of available PSCB's to be used (commonly referred to as a "PSCB free list"), and a list of active leaves in a particular tree (commonly referred to as a "rope"), as discussed below in FIGS. 2–6. Network processor 103 may further comprise a processor (not shown), commonly referred to as a packet processor, coupled to the memory (not shown). The packet processor (not shown) may be configured to execute the instructions of the program. It is noted that the steps of the method performed by the program mentioned above may in an alternative embodiment be implemented in hardware such as in an Application Specific Integrated Circuit (ASIC).

Figure 2:
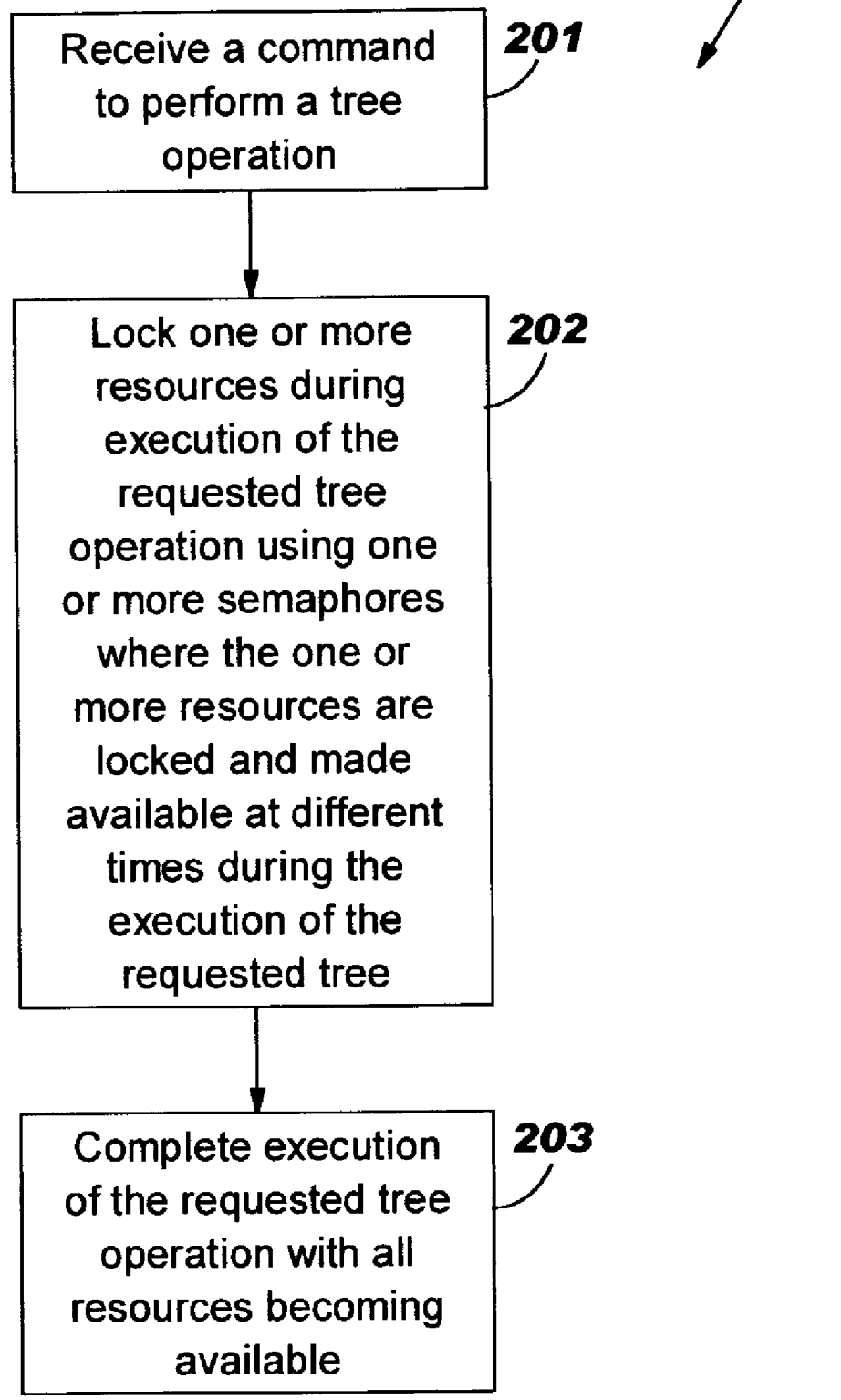
FIG. 2 is a flowchart of a method for eliminating memory corruption when performing tree operations on multiple threads in accordance with the present invention.

FIG. 2—Method for Eliminating Memory Corruption when Performing Tree Operations on Multiple Threads FIG. 2 is a flowchart of one embodiment of the present invention of a method 200 for eliminating memory corruption when performing multi-thread tree operations.

Referring to FIG. 2, in conjunction with FIG. 1, in step 201, network processor 103, e.g., network processor 103A, may receive a command to perform a tree operation, e.g., leaf insert, leaf update, leaf read, leaf delete, on a particular tree on one of the multiple threads from control point 105. Network processor 103 may further receive in step 201 a tree identifier indicating a particular tree, a key and leaf data (if any) from control point 105. As stated above, control point 105 may be configured to transmit frames, i.e., packets of data, to network processor(s) 103 comprising commands to perform particular operations on a tree, e.g., insert leaf, update leaf, read leaf, delete leaf. These frames may further comprise a tree identifier indicating a particular tree, leaf data for certain tree operations, as well as a key, e.g., 32-bit binary number.

Figure 3:
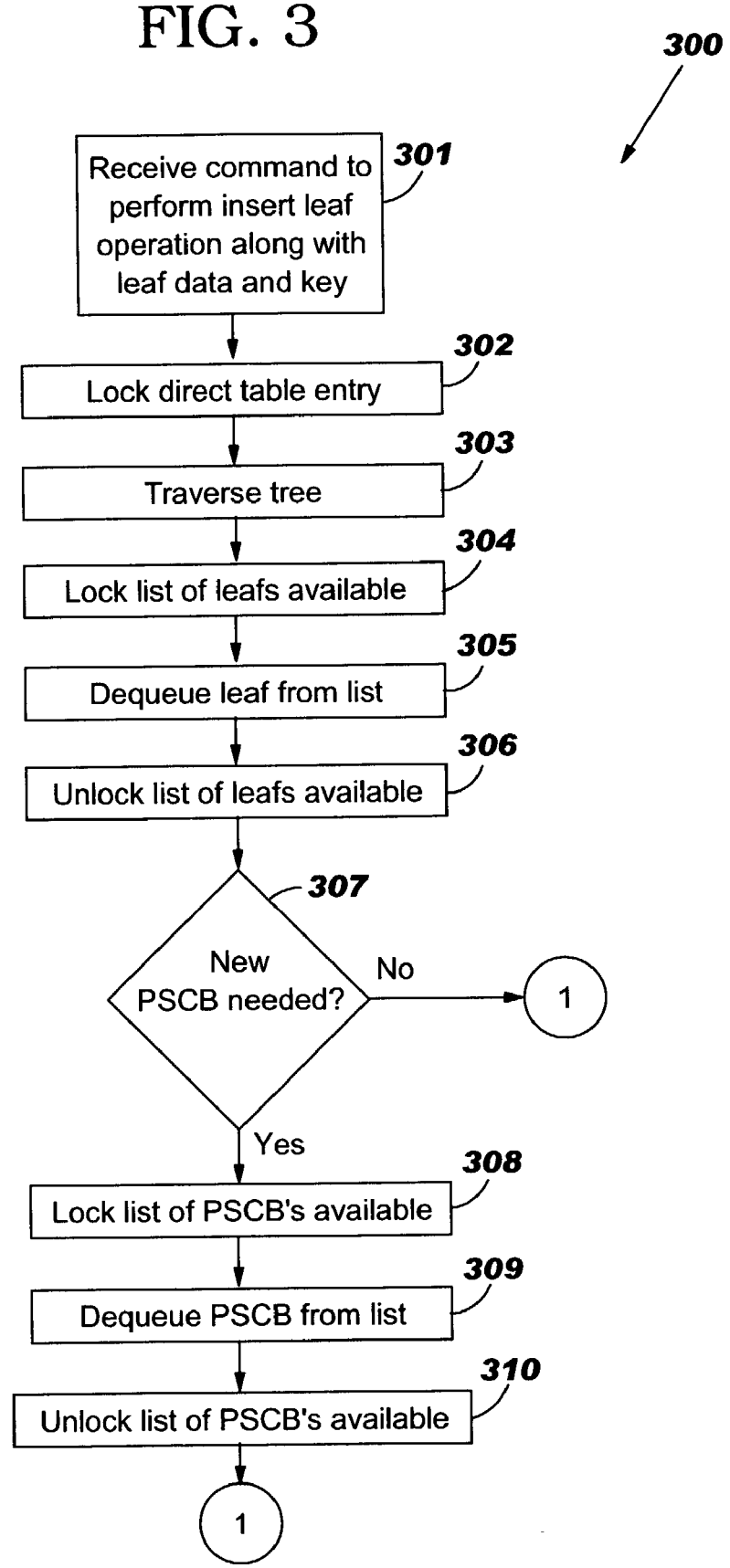
FIG. 3 is a flowchart of a method for eliminating memory corruption during execution of the leaf insert operation in accordance with the present invention.
Figure 3:
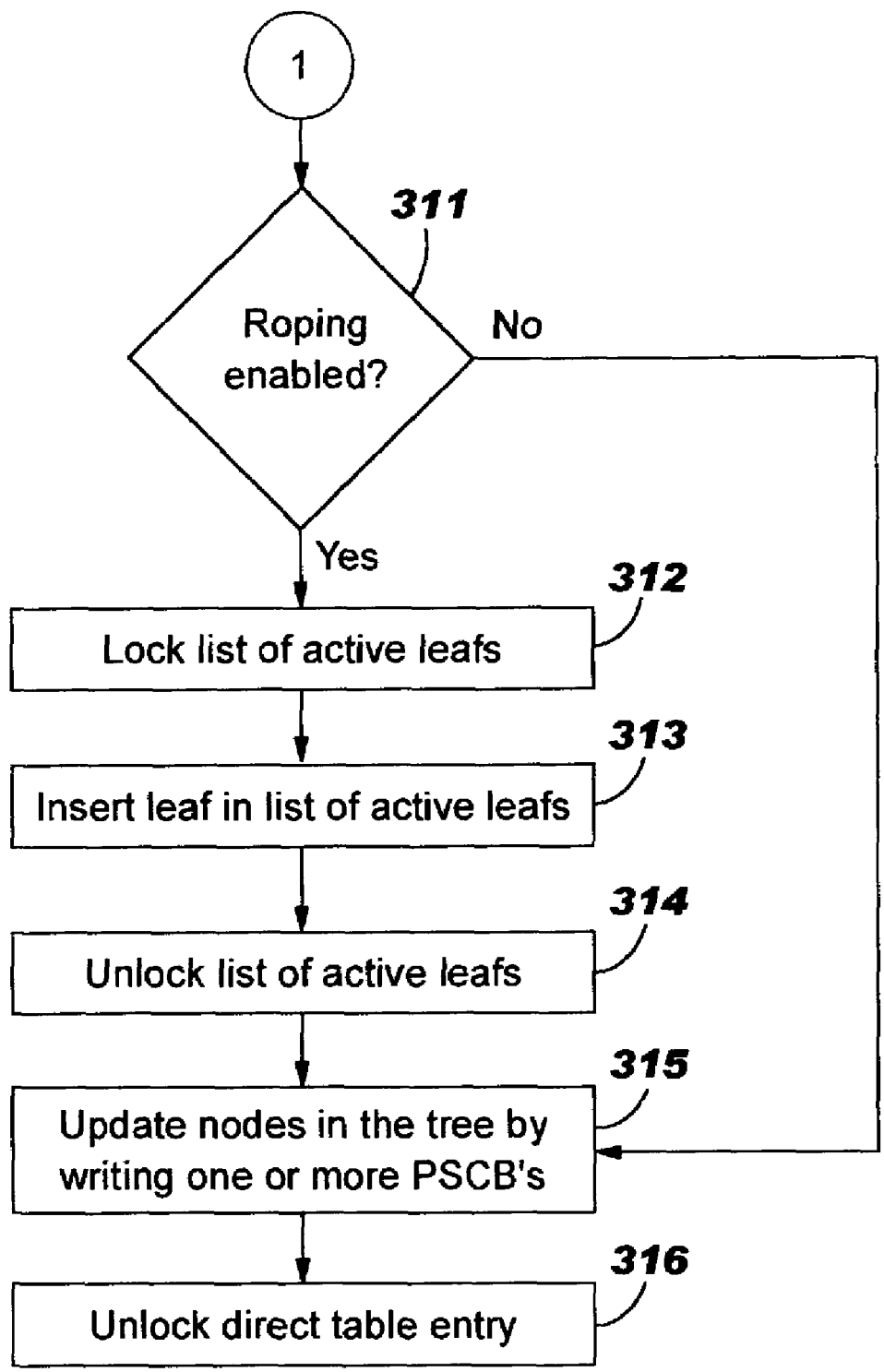
Figure 4:
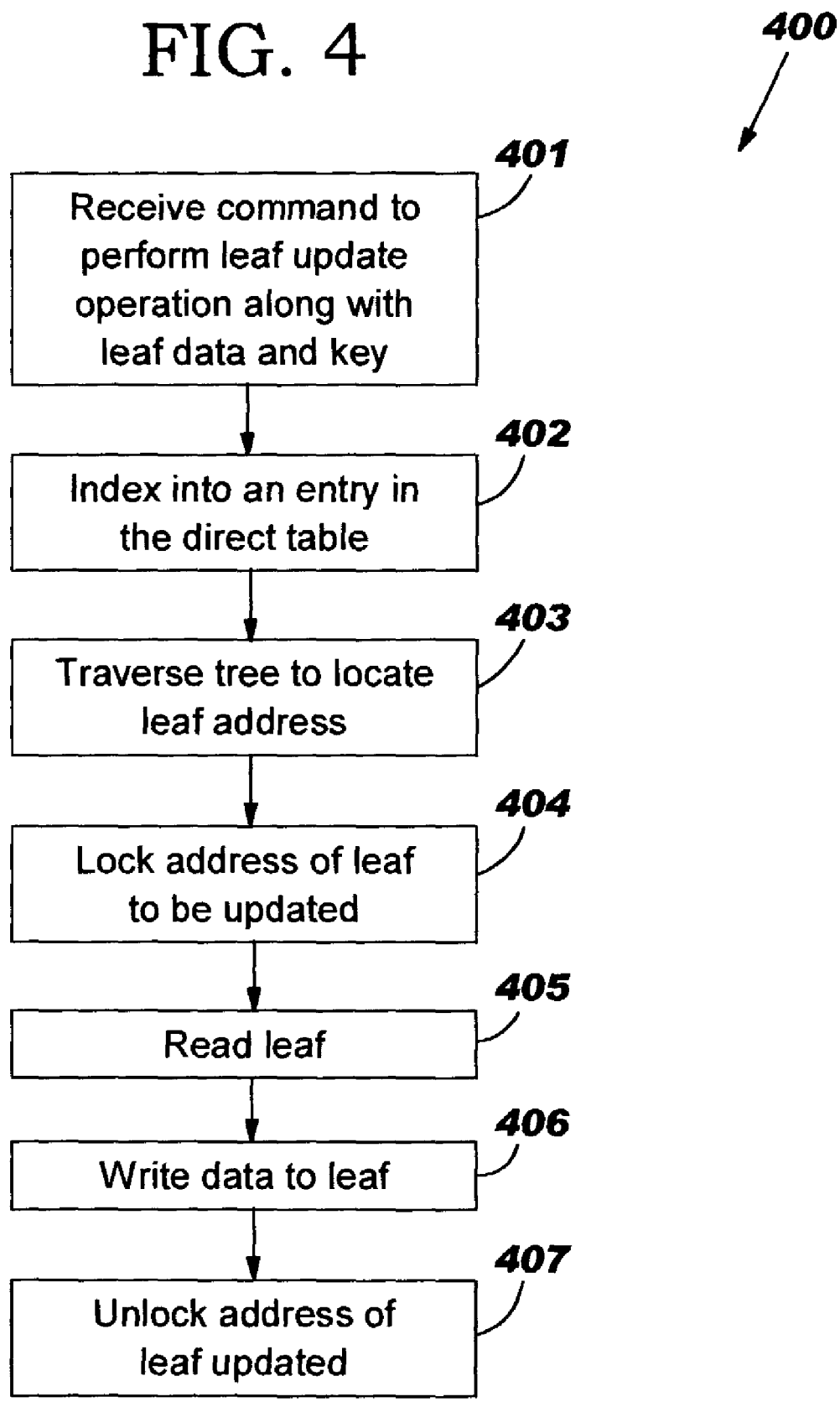
FIG. 4 is a flowchart of a method for eliminating memory corruption during execution of the leaf update operation in accordance with the present invention.
Figure 5:
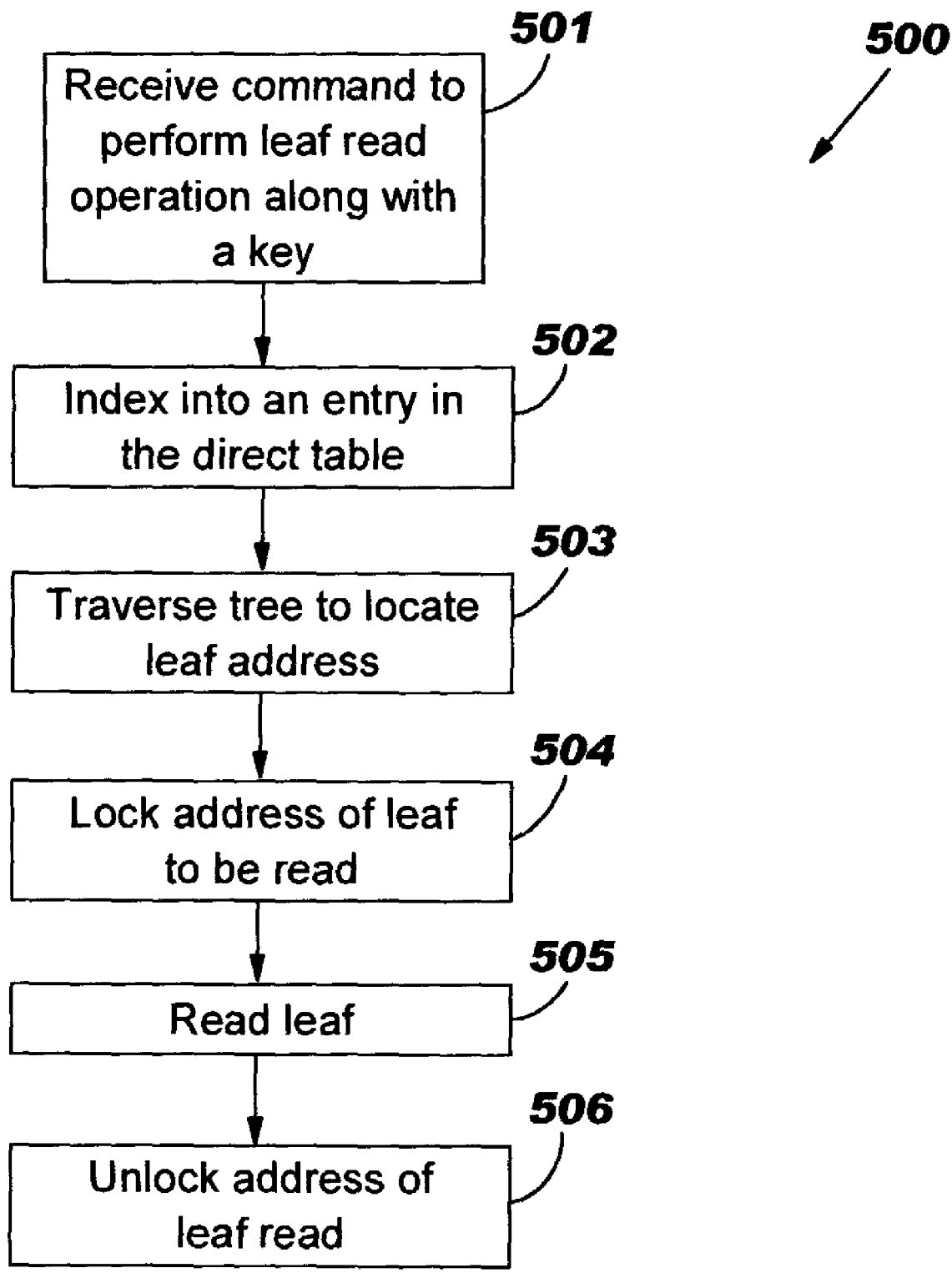
FIG. 5 is a flowchart of a method for eliminating memory corruption during execution of the leaf read operation in accordance with the present invention.
Figure 6:
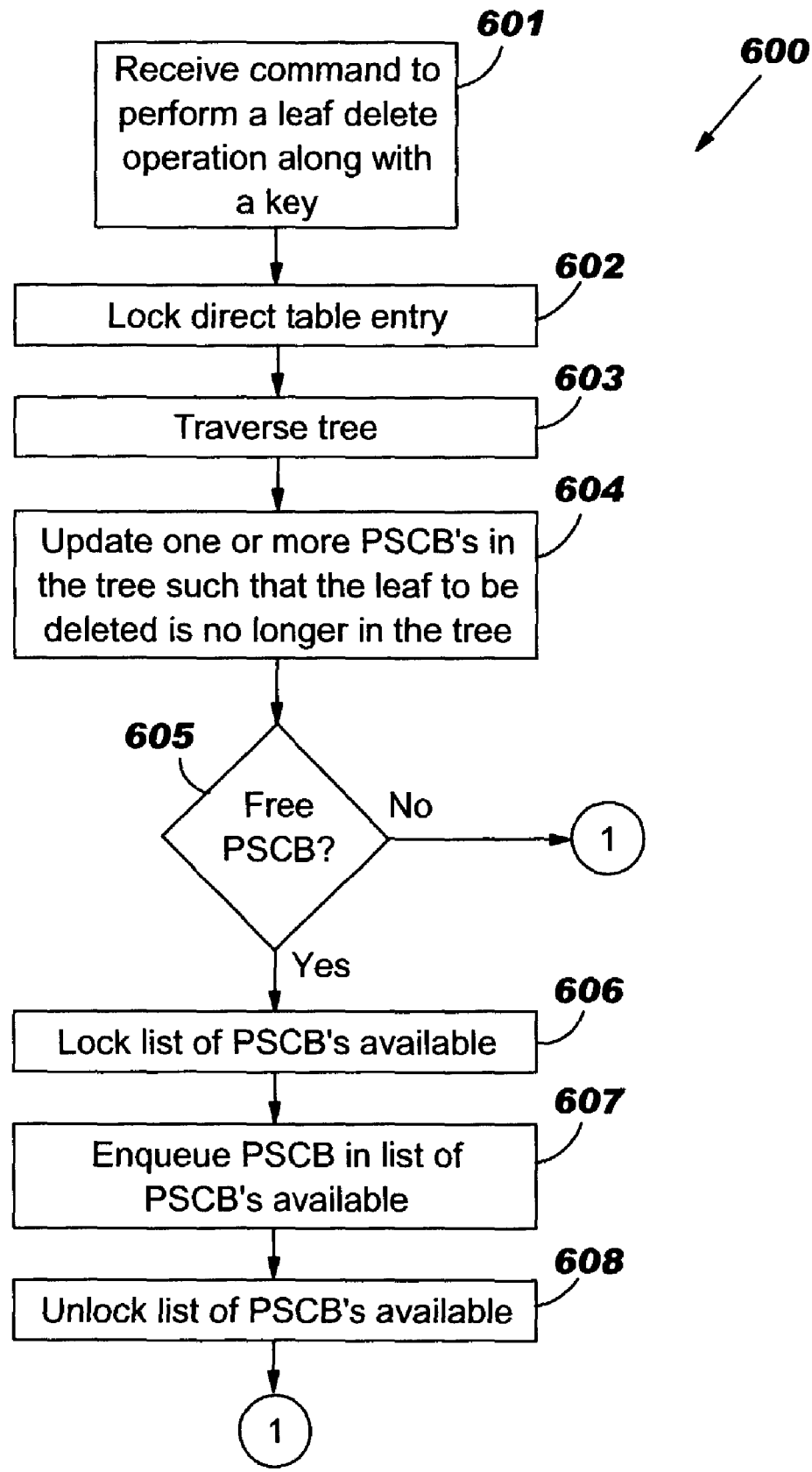
FIG. 6 is a flowchart of a method for eliminating memory corruption during execution of the leaf delete operation in accordance with the present invention.
Figure 6:
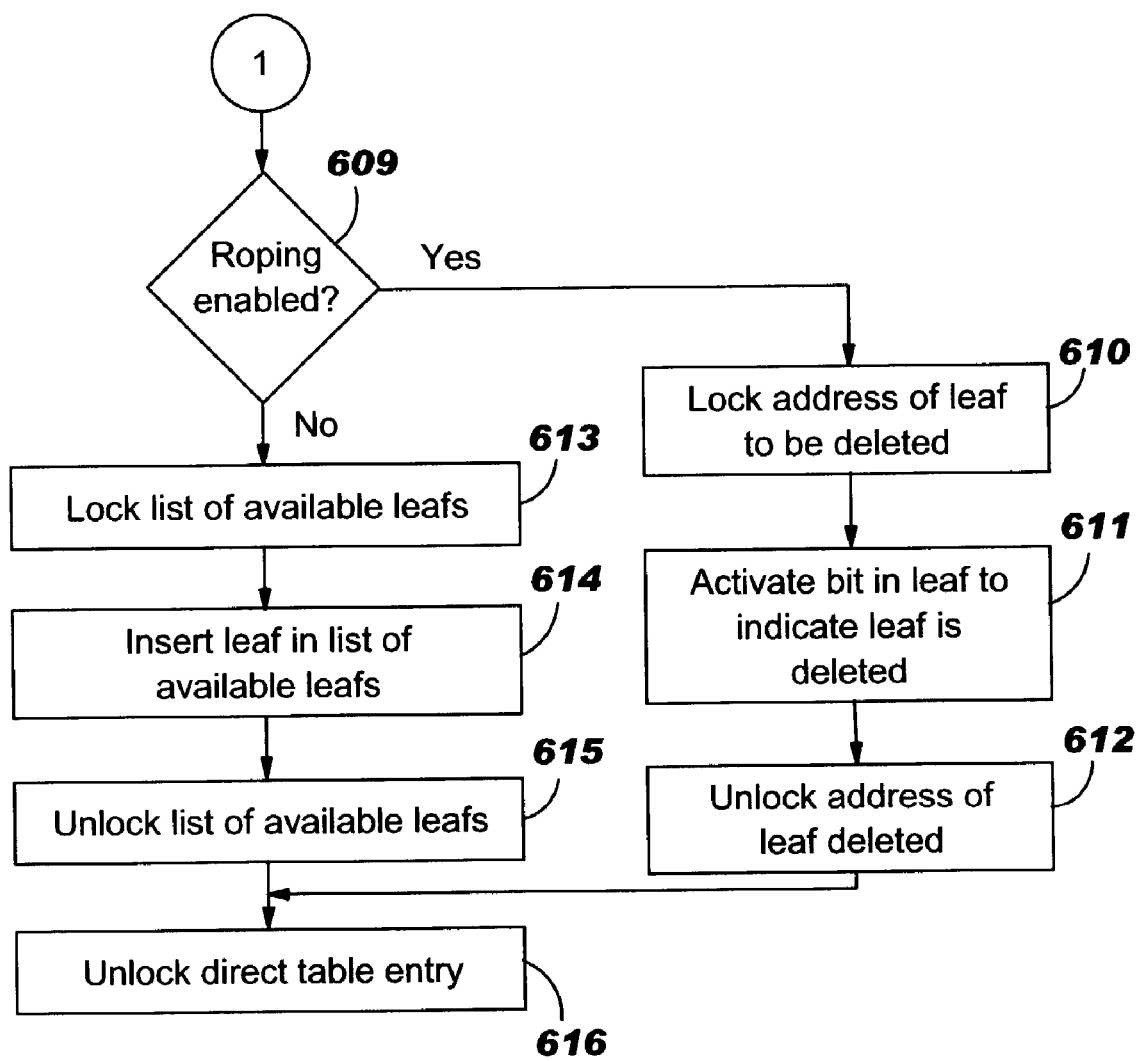

In step 202, network processor 103 may lock one or more resources, e.g., address of a leaf, direct table, leaf free list, PSCB free list, list of actives leaves in a tree, during a portion of the execution of the requested tree operation using one or more semaphores. A semaphore may refer to a software or hardware flag used to indicate whether to "lock" or make available the resource associated with the semaphore. Locking may refer to preventing the resource from being available to other threads in the system. Hence, by locking one or more resources during a portion of the execution of the tree operation, memory corruption may be eliminated in a multiple thread system. That is, by locking particular resources, e.g., direct table, list of available leaves to be used, list of available PSCB's to be used, list of active leaves in a tree, that may be subject to corruption if more than one tree operation were performed substantially in a concurrent manner in the correct sequence, memory corruption may be eliminated. Furthermore, these resources may be prevented from being used by other threads for a minimal amount of time by locking them for only a portion of the duration of the tree operation. Furthermore, by locking resources for only a portion of the duration of the tree operation, a minimal number of semaphores may be used. A more detailed description of network processor 103 locking one or more resources during a portion of the execution of various requested tree operations using one or more semaphores is provided further below in conjunction with FIGS. 3–6. FIG. 3 is a flowchart of one embodiment of the present invention of network processor 103 locking one or more resources during execution of the leaf insert operation using one or more semaphores. FIG. 4 is a flowchart of one embodiment of the present invention of network processor 103 locking one or more resources during execution of the leaf update operation using one or more semaphores. FIG. 5 is a flowchart of one embodiment of the present invention of network processor 103 locking one or more resources during execution of the leaf read operation using one or more semaphores. FIG. 6 is a flowchart of one embodiment of the present invention of network processor 103 locking one or more resources during execution of the leaf delete operation using one or more semaphores.

In step 203, execution of the requested tree operation by network processor 103 may be completed thereby freeing all resources for use for other threads.

It is noted that method 200 may be executed in a different order presented and that the order presented in the discussion of FIG. 2 is illustrative. It is further noted that certain steps in FIG. 2 may be executed almost concurrently.

FIG. 3—Flowchart of Eliminating Memory Corruption During Execution of the Leaf Insert Operation FIG. 3 is a flowchart of one embodiment of the present invention of a method 300 for eliminating memory corruption during execution of the leaf insert operation using one or more semaphores.

Referring to FIG. 3, in conjunction with FIG. 1, in step 301, network processor 103, e.g., network processor 103A, may receive the leaf insert command as well as leaf data and a key from control point 105. As stated above, control point 105 may be configured to transmit frames, i.e., packets of data, to network processor(s) 103 comprising commands to perform particular operations on a tree, e.g., insert leaf. These frames may further comprise a tree identifier indicating a particular tree, leaf data, as well as a key, e.g., 32-bit binary number.

In step 302, network processor 103 may lock the entry in the direct table indexed by the received key, e.g., 32-bit key. As stated above, network processor 103 may use a portion of the bits of the key, e.g., 16 most significant bits, to access an entry into the direct table.

In step 303, network processor 103 may traverse the tree using the remaining bits of the key, e.g., 16 least significant bits, that are not used for indexing into the direct table, to locate the address of where to insert the leaf. As stated above, the direct table may comprise entries storing either a leaf or an address of the first node (PSCB) of a tree structure. Since normally the entry indexed into the direct table is a PSCB, steps 303–316 of illustrative method 300 assumes that the entry indexed into the direct table was a PSCB.

In step 304, network processor 103 may lock the leaf free list thereby preventing other threads from accessing the leaf free list. The leaf free list may refer to leaves that are available to be inserted in a particular tree. By preventing other threads from accessing the leaf free list, memory corruption may be eliminated in a multiple thread system. For example, if the leaf free list was not locked, then two threads might dequeue the same leaf thereby causing the date structure to become corrupted. In one embodiment, the leaf free list may be a data structure storing leaves available. In another embodiment, the leaf free list available may be stored in a queue.

In step 305, the leaf to be inserted in the tree may be dequeued from the leaf free list. That is, the leaf to be inserted in the tree, where the tree is the tree identified by the PSCB located in the indexed entry of the direct table, may be dequeued from the leaf free list.

In step 306, the leaf free list may be unlocked by network processor 103. Hence the leaf free list may be locked only a portion of the duration of the execution of the leaf insert tree operation thereby locking a resource for a minimal amount of time. By locking the leaf free list for a minimal amount of time, the aggregate system performance may not be hampered since other threads may be allowed to access the leaf free list except during the short period the leaf free list is locked. Furthermore, by locking a resource for a minimal amount of time, a minimal number of semaphores may be used.

In step 307, a determination may be made by network processor 103 as to whether a new PSCB, i.e., a new node, needs to be created at the location identified by the key. The new node may be inserted before or after the existing node thereby causing the tree to "grow". If a new PSCB is to be created, then, in step 308, the PSCB free list may be locked thereby preventing other threads from accessing the PSCB free list. The PSCB free list may refer to nodes that are available to be used. By preventing other threads from accessing the PSCB free list, memory corruption may be eliminated in a multiple thread system. For example, this may prevent two threads from dequeuing the same PSCB. In one embodiment, the PSCB free list may be a data structure storing PSCB's available. In another embodiment, the PSCB free list may be stored in a queue.

In step 309, the next PSCB in the PSCB free list may be dequeued from the list to be inserted in the tree as discussed further below. In step 310, the PSCB free list may be unlocked by network processor 103. Hence the PSCB free list may be locked only a portion of the duration of the execution of the leaf insert tree operation thereby locking a resource for a minimal amount of time. By locking a resource for a minimal amount of time, a minimal number of semaphores may be used. After the PSCB free list has been unlocked, another thread may lock it and dequeue another PSCB.

Referring to steps 307 and 310, if a new PSCB does not need to be created or upon the PSCB free list being unlocked by network processor 103, a determination may be made in step 311 by network processor 103 as to whether "roping" is enabled. A rope may refer to a list of active leaves in the tree structure traversed in step 303. Hence, the determination of whether roping is enabled may refer to determining whether network processor 103 maintains a list of active leaves for the tree structure traversed in step 303. In one embodiment, the list of active leaves in a particular tree may be a data structure storing the list of active leaves in a particular tree. In another embodiment, the list of active leaves in a particular tree may be stored in a circular linked list.

If roping is enabled, then network processor 103 may lock the list of active leaves (the rope) in step 312 thereby preventing other threads from accessing the rope. By preventing other threads from accessing the rope, memory corruption may be eliminated in a multiple thread system. For example, if the rope was not protected, then multiple threads may simultaneously insert leaves into the rope thereby corrupting the rope. In one embodiment, the rope may be a data structure storing active leaves. In another embodiment, the rope may be stored in a circular linked list.

In step 313, the leaf to be inserted in the tree may be inserted in the rope in the tree structure traversed in step 303. In step 314, the rope may be unlocked by network processor 103. Hence the rope may be locked only a portion of the duration of the execution of the leaf insert tree operation thereby locking a resource for a minimal amount of time. By locking the rope for a minimal amount of time, the aggregate system performance may not be hampered since other threads may be allowed to access the rope except during the short period the rope is locked. Furthermore by locking a resource for a minimal amount of time, a minimal number of semaphores may be used.

Referring to steps 311 and 314, if roping is not enabled or upon the rope being unlocked by network processor 103, then, in step 315, the nodes in the tree may be updated by writing one or more PSCB's (one of which may contain the address of the new leaf). In step 316, the direct table entry may be unlocked by network processor 103.

The locking and unlocking of a resource, e.g., direct table, leaf free list, PSCB free list, rope, in method 300 based on the value of one or more semaphores is shown below in the exemplary Table 1.

TABLE 1

| Steps to Perform in Leaf Insert Operation | Semaphore 0 | Semaphore 1 |
|---|---|---|
| Receive command to perform leaf insert operation | 0 | 0 |
| Lock DT entry | 1 | 0 |
| Traverse tree | 1 | 0 |
| Lock leaf free list | 1 | 1 |
| Dequeue leaf from leaf free list | 1 | 1 |
| Unlock leaf free list | 1 | 0 |
| If new PSCB needed { | 1 | 0 |
| Lock PSCB free list | 1 | 1 |
| Dequeue PSCB from PSCB free list | 1 | 1 |
| Unlock PSCB free list | 1 | 0 |
| } | | |
| Write leaf | 1 | 0 |
| If roping is enabled { | 1 | 0 |
| Lock rope | 1 | 1 |
| Insert leaf in rope | 1 | 1 |
| Unlock rope } | 1 | 0 |
| Update PSCB(s) | 1 | 0 |
| Unlock direct table entry | 0 | 0 |

Table 1 above illustrates an exemplary table illustrating the locking and unlocking of a resource, e.g., direct table, leaf free list, PSCB free list, rope, based on the value of one or more semaphores. As stated above, a semaphore may refer to a software or hardware flag used to indicate whether to "lock" or make available the resource associated with the semaphore. Each semaphore may be associated with an address of a particular resource. For example, referring to Table 1, one semaphore as indicated by "semaphore 0" in Table 1 may be associated with the address of a direct table entry. When the value of "semaphore 0" is 1, then the address of the direct table entry associated with semaphore 0 may be locked. That is, when the value of "semaphore 0" is 1, then the address of the direct table entry associated with semaphore 0 may be prevented from being available to other threads in the system. When the value of "semaphore 0" is 0, then the address of the direct table entry associated with semaphore 0 may be made available to other threads in the system. Similarly, one semaphore as indicated by "semaphore 1" in Table 1 may be associated with the leaf free list, the PSCB free list as well as the rope in a tree during a portion of the leaf insert operation. For example, referring to Table 1, "semaphore 1" in Table 1 may be associated with the address of the leaf free list during a portion of the leaf insert operation. When the value of "semaphore 1" is 1, then the address of the leaf free list associated with semaphore 1 may be locked. That is, when the value of "semaphore 1" is 1, then the address of the leaf free list associated with semaphore 1 may be prevented from being available to other threads in the system. When the value of "semaphore 1" is 0, then the address of the leaf free list associated with semaphore 1 may be made available to other threads in the system. Hence, the leaf free list may be locked for only a portion of the duration of the execution of the leaf insert tree operation thereby locking a resource for a minimal amount of time. Other resources such as the PSCB free list and the rope in the tree may similarly be associated with semaphore 1 as illustrated in Table 1.

It is noted that method 300 may be executed in a different order presented and that the order presented in the discussion of FIG. 3 is illustrative. It is further noted that certain steps in FIG. 3 may be executed almost concurrently.

FIG. 4—Flowchart of Eliminating Memory Corruption During Execution of the Leaf Update Operation FIG. 4 is a flowchart of one embodiment of the present invention of a method 400 for eliminating memory corruption during execution of the leaf update operation using one or more semaphores.

Referring to FIG. 4, in conjunction with FIG. 1, in step 401, network processor 103, e.g., network processor 103A, may receive the leaf update command as well as leaf data and a key from control point 105. As stated above, control point 105 may be configured to transmit frames, i.e., packets of data, to network processor(s) 103 comprising commands to perform particular operations on a tree, e.g., update leaf. These frames may further comprise a tree identifier indicating a particular tree, leaf data, as well as a key, e.g., 32-bit binary number.

In step 402, network processor 103 may index into an entry in the direct table indexed using the received key, e.g., 32-bit key. As stated above, network processor 103 may use a portion of the bits of the key, e.g., 16 most significant bits, to access an entry into the direct table.

In step 403, network processor 103 may traverse the tree using the remaining bits of the key, e.g., 16 least significant bits, that are not used for indexing into the direct table, to locate the address of the leaf to be updated. As stated above, the direct table may comprise entries storing either a leaf or an address of the first node of a tree. Since normally the entry indexed into the direct table is a PSCB, steps 403–407 of illustrative method 400 assumes that the entry indexed into the direct table was a PSCB. Hence, in step 403, network processor 103 may traverse the tree structure associated with the PSCB identified in the entry indexed in the direct table to locate the address of the leaf to be updated.

In step 404, the address of the leaf to be updated may be locked by network processor 103. By preventing other threads from accessing the leaf to be updated, memory corruption may be eliminated in a multiple thread system.

In step 405, the leaf to be updated may be read by network processor 103. In step 406, network processor 103 may write the leaf data received from control point 105 into the leaf read. In step 407, network processor 103 may unlock the address of the leaf updated. Hence the address of the leaf updated may be locked only a portion of the duration of the execution of the leaf update tree operation thereby locking a resource for a minimal amount of time. By locking a resource for a minimal amount of time, a minimal number of semaphores may be used.

The locking and unlocking of a resource, e.g., address of a leaf to be updated, in method 400 based on the value of one or more semaphores is shown below in the exemplary Table 2.

TABLE 2

| Steps to Perform in Leaf Update Operation | Semaphore 0 | Semaphore 1 |
| --- | --- | --- |
| Receive command to perform leaf update operation | 0 | 0 |
| Index into DT entry | 0 | 0 |
| Traverse tree | 0 | 0 |
| Lock address of leaf to be updated | 0 | 1 |
| Read leaf | 0 | 1 |
| Write data to leaf | 0 | 1 |
| Unlock address of leaf updated | 0 | 0 |

Table 2 above illustrates an exemplary table illustrating the locking and unlocking of a resource, e.g., address of leaf to be updated, based on the value of one or more semaphores. For example, referring to Table 2, one semaphore as indicated by "semaphore 1" in Table 2 may be associated with the address of a leaf to be updated. When the value of "semaphore 1" is 1, then the address of the leaf to be updated associated with semaphore 1 may be locked. That is, when the value of "semaphore 1" is 1, then the address of the leaf to be updated associated with semaphore 1 may be prevented from being available to other threads in the system. When the value of "semaphore 1" is 0, then the address of the leaf to be updated associated with semaphore 1 may be made available to other threads in the system. Hence, the address of a leaf may be locked for only a portion of the duration of the execution of the leaf update tree operation thereby locking a resource for a minimal amount of time.

It is noted that method 400 may be executed in a different order presented and that the order presented in the discussion of FIG. 4 is illustrative. It is further noted that certain steps in FIG. 4 may be executed almost concurrently.

FIG. 5—Flowchart of Eliminating Memory Corruption During Execution of the Leaf Read Operation FIG. 5 is a flowchart of one embodiment of the present invention of a method 500 for eliminating memory corruption during execution of the leaf read operation using one or more semaphores.

Referring to FIG. 5, in conjunction with FIG. 1, in step 501, network processor 103, e.g., network processor 103A, may receive the leaf read command as well as a key from control point 105. As stated above, control point 105 may be configured to transmit frames, i.e., packets of data, to network processor(s) 103 comprising commands to perform particular operations on a tree, e.g., read leaf. These frames may further comprise a tree identifier indicating a particular tree as well as a key, e.g., 32-bit binary number.

In step 502, network processor 103 may index into an entry in the direct table indexed using the received key, e.g., 32-bit key. As stated above, network processor 103 may use a portion of the bits of the key, e.g., 16 most significant bits, to access an entry into the direct table.

In step 503, network processor 103 may traverse the tree using the remaining bits of the key, e.g., 16 least significant bits, that are not used for indexing into the direct table, to locate the address of the leaf to be read. Since normally the entry indexed into the direct table is a PSCB, steps 503–506 of illustrative method 500 assumes that the entry indexed into the direct table was a PSCB. Hence, in step 503, network processor 103 may traverse the tree structure associated with the PSCB identified in the entry indexed in the direct table to locate the address of the leaf to be read.

In step 504, the address of the leaf to be read may be locked by network processor 103. By preventing other threads from accessing the leaf to be updated, memory corruption may be eliminated in a multiple thread system.

In step 505, the leaf whose address has been locked may be read by network processor 103. In step 506, network processor 103 may unlock the address of the leaf read. Hence the address of the leaf read may be locked only a portion of the duration of the execution of the leaf read tree operation thereby locking a resource for a minimal amount of time.

The locking and unlocking of a resource, e.g., address of a leaf read, in method 500 based on the value of one or more semaphores is shown below in the exemplary Table 3.

TABLE 3

| Steps to Perform in Leaf Read Operation | Semaphore 0 | Semaphore 1 |
|---|---|---|
| Receive command to perform leaf read operation | 0 | 0 |
| Index into DT entry | 0 | 0 |
| Traverse tree | 0 | 0 |
| Lock address of leaf to be read | 0 | 1 |
| Read leaf | 0 | 1 |
| Unlock address of leaf read | 0 | 0 |

Table 3 above illustrates an exemplary table illustrating the locking and unlocking of a resource, e.g., address of leaf to be read, based on the value of one or more semaphores. For example, referring to Table 3, one semaphore as indicated by "semaphore 1" in Table 3 may be associated with the address of a leaf to be read. When the value of "semaphore 1" is 1, then the address of the leaf to be read associated with semaphore 1 may be locked. That is, when the value of "semaphore 1" is 1, then the address of the leaf to be read associated with semaphore 1 may be prevented from being available to other threads in the system. When the value of "semaphore 1" is 0, then the address of the leaf to be read associated with semaphore 1 may be made available to other threads in the system. Hence, the address of a leaf may be locked for only a portion of the duration of the execution of the leaf read tree operation thereby locking a resource for a minimal amount of time. By locking a resource for a minimal amount of time, the occurrence of when another thread must wait for the locked resource may be minimized.

It is noted that method 500 may be executed in a different order presented and that the order presented in the discussion of FIG. 5 is illustrative. It is further noted that certain steps in FIG. 5 may be executed almost concurrently.

FIG. 6—Flowchart of Eliminating Memory Corruption During Execution of the Leaf Delete Operation FIG. 6 is a flowchart of one embodiment of the present invention of a method 600 for eliminating memory corruption during execution of the leaf delete operation using one or more semaphores.

Referring to FIG. 6, in conjunction with FIG. 1, in step 601, network processor 103, e.g., network processor 103A, may receive the leaf insert command as well as a key from control point 105. As stated above, control point 105 may be configured to transmit frames, i.e., packets of data, to network processor(s) 103 comprising commands to perform particular operations on a tree, e.g., delete leaf. These frames may further comprise a tree identifier indicating a particular tree as well as a key, e.g., 32-bit binary number.

In step 602, network processor 103 may lock the entry in the direct table indexed by the received key, e.g., 32-bit key. As stated above, network processor 103 may use a portion of the bits of the key, e.g., 16 most significant bits, to access an entry into the direct table.

In step 603, network processor 103 may traverse the tree using the remaining bits of the key, e.g., 16 least significant bits, that are not used for indexing into the direct table, to locate the address of where to delete the leaf. Since normally the entry indexed into the direct table is a PSCB, steps 603–616 of illustrative method 600 assumes that the entry indexed into the direct table was a PSCB.

In step 604, network processor 103 may update one or more PSCB's in the tree such that the leaf to be deleted is no longer in the tree. That is, one or more PSCB's may be updated in the tree where the pointer to the leaf to be deleted may be removed. In step 605, network processor 103 may determine if the PSCB located in the indexed entry in the direct table is to be "freed." If the leaf to be deleted is the last leaf in the tree, then the PSCB associated with that tree is no longer needed and hence may be added to the PSCB free list to be used in a future insert by this or another thread. It is noted that there may be other cases where it may be advantageous to compress the tree during the leaf delete process and free one or more PSCB's.

If the PSCB located in the indexed entry in the direct table is to be "freed", then network processor 103, in step 606, may lock the PSCB free list thereby preventing other threads from accessing the PSCB free list. By preventing other threads from accessing the PSCB free list, memory corruption may be eliminated in a multiple thread system. In one embodiment, the PSCB free list may be a data structure storing leaves available. In another embodiment, the PSCB free list may be stored in a queue.

In step 607, the PSCB to be freed may be enqueued in the PSCB free list.

In step 608, the PSCB free list may be unlocked by network processor 103. Hence the PSCB free list may be locked only a portion of the duration of the execution of the leaf delete tree operation thereby locking a resource for a minimal amount of time. By locking a resource for a minimal amount of time, a minimal number of semaphores may be used.

Referring to steps 605 and 608, if the PSCB does not need to be freed or upon the PSCB free list being unlocked by network processor 103, a determination may be made in step 609 by network processor 103 as to whether "roping" is enabled. A rope may refer to a list of active leaves in the tree structure traversed in step 603. Hence, the determination of whether roping is enabled may refer to determining whether network processor 103 maintains a list of active leaves in the tree. In one embodiment, the rope in a particular tree may be a data structure storing the rope in a particular tree. In another embodiment, the rope in a particular tree may be stored in a circular linked list.

If roping is enabled, then network processor 103 may lock the address of the leaf to be deleted in step 610. By preventing other threads from accessing the address of the leaf to be deleted, memory corruption may be eliminated in a multiple thread system.

In step 611, a bit in the leaf to be deleted may be activated by network processor 103 thereby indicating that the leaf is deleted. In step 612, the address of the leaf deleted may be unlocked by network processor 103. Hence the address of the leaf deleted may be locked only a portion of the duration of the execution of the leaf delete tree operation thereby locking a resource for a minimal amount of time.

However, if roping is not enabled, then the leaf free list may be locked by network processor 103 in step 613. The leaf free list may be locked to prevent other threads from accessing the leaf free list. By preventing other threads from accessing the leaf free list, memory corruption may be eliminated in a multiple thread system. In one embodiment, the leaf free list may be a data structure storing leaves available. In another embodiment, the leaf free list may be stored in a queue.

In step 614, the leaf to be deleted in the tree may be enqueued to the leaf free list.

In step 615, the leaf free list may be unlocked by network processor 103. Hence the leaf free list may be locked only a portion of the duration of the execution of the leaf insert tree operation thereby locking a resource for a minimal amount of time.

Referring to steps 612 and 615, upon the address of the leaf deleted being unlocked by network processor 103 or upon the address of the leaf free list being unlocked by network processor 103, network processor 103, in step 616, may unlock the indexed direct table entry.

The locking and unlocking of a resource, e.g., direct table, leaf free list, PSCB free list, address of leaf to be deleted, in method 600 based on the value of one or more semaphores is shown below in the exemplary Table 4.

TABLE 4

| Steps to Perform in Leaf Delete Operation | Semaphore 0 | Semaphore 1 |
|---|---|---|
| Receive command to perform leaf delete operation | 0 | 0 |
| Lock DT entry | 1 | 0 |
| Traverse tree | 1 | 0 |
| Update on or more PSCB's | 1 | 0 |
| If freeing PSCB { | 1 | 0 |
| Lock PSCB free list | 1 | 1 |
| Enqueue PSCB in PSCB free list | 1 | 1 |
| Unlock PSCB free list } | 1 | 0 |
| If roping is enabled { | 1 | 0 |
| Lock address of leaf to be deleted | 1 | 1 |
| Activate bit in leaf to indicate leaf is deleted | 1 | 1 |
| Unlock address of leaf deleted } | 1 | 0 |
| If roping is disenabled { | 1 | 0 |
| Lock leaf free list | 1 | 1 |
| Enqueue leaf to be deleted in leaf free list | 1 | 1 |
| Unlock leaf free list } | 1 | 0 |
| Unlock direct table entry | 0 | 0 |

Table 4 above illustrates an exemplary table illustrating the locking and unlocking of a resource, e.g., direct table, leaf free list, PSCB free list, address of leaf to be deleted, based on the value of one or more semaphores. As stated above, a semaphore may refer to a software or hardware flag used to indicate whether to "lock" or make available the resource associated with the semaphore. Each semaphore may be associated with an address of a particular resource. For example, referring to Table 4, one semaphore as indicated by "semaphore 0" in Table 4 may be associated with the address of a direct table entry. When the value of "semaphore 0" is 1, then the address of the direct table entry associated with semaphore 0 may be locked. That is, when the value of "semaphore 0" is 1, then the address of the direct table entry associated with semaphore 0 may be prevented from being available to other threads in the system. When the value of "semaphore 0" is 0, then the address of the direct table entry associated with semaphore 0 may be made available to other threads in the system. Similarly, one semaphore as indicated by "semaphore 1" in Table 4 may be associated with the leaf free list, the PSCB free list as well as the address of the leaf to be deleted during a portion of the leaf insert operation. For example, referring to Table 4, "semaphore 1" in Table 4 may be associated with the address of the leaf free list during a portion of the leaf insert operation. When the value of "semaphore 1" is 1, then the address of the leaf free list associated with semaphore 1 may be locked. That is, when the value of "semaphore 1" is 1, then the address of the leaf free list associated with semaphore 1 may be prevented from being available to other threads in the system. When the value of "semaphore 1" is 0, then the address of the leaf free list associated with semaphore 1 may be made available to other threads in the system. Hence, the leaf free list may be locked for only a portion of the duration of the execution of the leaf insert tree operation thereby locking a resource for a minimal amount of time. Other resources such as the PSCB free list and the address of the leaf to be deleted in the tree may similarly be associated with semaphore 1 as illustrated in Table 4.

It is noted that method 600 may be executed in a different order presented and that the order presented in the discussion of FIG. 6 is illustrative. It is further noted that certain steps in FIG. 6 may be executed almost concurrently.

Although the system, computer program product and method are described in connection with several embodiments, it is not intended to be limited to the specific forms set forth herein; but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for eliminating memory corruption comprising the steps of:
   receiving a command to perform a tree operation on a tree associated with a thread; and
   locking one or more resources associated with said requested tree operation during an execution of said requested tree operation using a first and a second semaphore, wherein said one or more resources are associated with said first semaphore and said second semaphore, wherein the step of locking further comprises the steps of:
      indicating whether a resource associated with said first semaphore is locked or is available to be accessed by other threads based on a value of said first semaphore; and
      indicating whether a resource associated with said second semaphore during a portion of said execution of said requested tree operation is locked or is available to be accessed by other threads based on a value of said second semaphore;
   wherein said resource associated with said second semaphore is locked during a portion of said execution of said requested tree operation, wherein said resource associated with said second semaphore is made available during a remaining portion of said execution of said requested tree operation.

2. The method as recited in claim 1, wherein said one or more resources comprises at least one of the following: direct table, list of available leaves to be used, a list of available Pattern Search Control Block's (PSCB's) to be used, address of a leaf, and a list of active leaves in a particular tree, wherein said direct table is a table storing one or more of the following: an address of a leaf and an address of a PSCB.

3. The method as recited in claim 1, wherein said requested tree operation is at least one of the following: insert leaf, update leaf, read leaf and delete leaf.

4. The method as recited in claim 3, wherein during said insert leaf operation the method further comprises the steps of:
   locking a direct table during said insert leaf operation, wherein said direct table is a table storing one or more of the following: an address of a leaf and an address of a PSCB; and
   locking a list of available leaves during a portion of said insert leaf operation.

5. The method as recited in claim 4, wherein said second semaphore is associated with an address of said list of available leaves during said insert leaf operation, wherein a first value of said second semaphore indicates to lock said list of available leaves, wherein a second value of said second semaphore indicates to make available said list of available leaves to other threads, wherein said list of available leaves is locked and made available at different times during said insert leaf operation.

6. The method as recited in claim 3, wherein during said read leaf operation the method further comprises the step of:
   locking an address of a leaf to be read during a portion of said read leaf operation.

7. The method as recited in claim 6, wherein said second semaphore is associated with said address of said leaf to be read during said read leaf operation, wherein a first value of said second semaphore indicates to lock said address of said leaf, wherein a second value of said second semaphore indicates to make available said address of said leaf to other threads, wherein said address of said leaf is locked and made available at different times during said update leaf operation.

8. The method as recited in claim 3, wherein during said update leaf operation the method further comprises the step of:
   locking an address of a leaf to be updated during a portion of said update leaf operation.

9. The method as recited in claim 8, wherein said second semaphore is associated with said address of said leaf to be updated during said update leaf operation, wherein a first value of said second semaphore indicates to lock said address of said leaf, wherein a second value of said second semaphore indicates to make available said address of said leaf to other threads, wherein said address of said leaf is locked and made available at different times during said update leaf operation.

10. A computer program product embodied in a machine readable medium for eliminating memory corruption comprising the programming steps of:
    receiving a command to perform a tree operation on a tree associated with a thread; and
    locking one or more resources associated with said requested tree operation during an execution of said requested tree operation using a first and a second semaphore, wherein said one or more resources are associated with said first semaphore and said second semaphore, wherein the programming step of locking further comprises the programming steps of:
       indicating whether a resource associated with said first semaphore is locked or is available to be accessed by other threads based on a value of said first semaphore; and
       indicating whether a resource associated with said second semaphore during a portion of said execution of said requested tree operation is locked or is available to be accessed by other threads based on a value of said second semaphore;
    wherein said resource associated with said second semaphore is locked during a portion of said execution of said requested tree operation, wherein said resource associated with said second semaphore is made available during a remaining portion of said execution of said requested tree operation.

11. The computer program product as recited in claim 10, wherein said one or more resources comprises at least one of the following: direct table, list of available leaves to be used, a list of available Pattern Search Control Block's (PSCB's) to be used, address of a leaf, and a list of active leaves in a particular tree, wherein said direct table is a table storing one or more of the following: an address of a leaf and an address of a PSCB.

12. The computer program product as recited in claim 10, wherein said requested tree operation is at least one of the following: insert leaf, update leaf, read leaf and delete leaf.

13. The computer program product as recited in claim 12, wherein during said insert leaf operation the computer program product further comprises the programming steps of:
    locking a direct table during said insert leaf operation, wherein said direct table is a table storing one or more of the following: an address of a leaf and an address of a PSCB; and
    locking a list of available leaves during a portion of said insert leaf operation.

14. The computer program product as recited in claim 13, wherein said second semaphore is associated with an address of said list of available leaves during said insert leaf operation, wherein a first value of said second semaphore indicates to lock said list of available leaves, wherein a second value of said second semaphore indicates to make available said list of available leaves to other threads, wherein said list of available leaves is locked and made available at different times during said insert leaf operation.

15. The computer program product as recited in claim 12, wherein during said read leaf operation the computer program product further comprises the programming step of:
   locking an address of a leaf to be read during a portion of said read leaf operation.

16. The computer program product as recited in claim 15, wherein said second semaphore is associated with said address of said leaf to be read during said read leaf operation, wherein a first value of said second semaphore indicates to lock said address of said leaf, wherein a second value of said second semaphore indicates to make available said address of said leaf to other threads, wherein said address of said leaf is locked and made available at different times during said update leaf operation.

17. The computer program product as recited in claim 12, wherein during said update leaf operation the computer program product further comprises the programming step of:
   locking an address of a leaf to be updated during a portion of said update leaf operation.

18. The computer program product as recited in claim 17, wherein said second semaphore is associated with said address of said leaf to be updated during said update leaf operation, wherein a first value of said second semaphore indicates to lock said address of said leaf, wherein a second value of said second semaphore indicates to make available said address of said leaf to other threads, wherein said address of said leaf is locked and made available at different times during said update leaf operation.

19. A network processor, comprising:
   a memory unit operable for storing a computer program for eliminating memory corruption; and
   a processor coupled to said memory unit, wherein said processor, responsive to said computer program, comprises:
      circuitry operable for receiving a command to perform a tree operation on a tree associated with a thread; and
      circuitry operable for locking one or more resources associated with said requested tree operation during an execution of said requested tree operation using a first and a second semaphore, wherein said one or more resources are associated with said first semaphore and said second semaphore, wherein said circuitry operable for locking further comprises:
         circuitry operable for indicating whether a resource associated with said first semaphore is locked or is available to be accessed by other threads based oh a value of said first semaphore; and
         circuitry operable for indicating whether a resource associated with said second semaphore during a portion of said execution of said requested tree operation is locked or is available to be accessed by other threads based on a value of said second semaphore;
      wherein said resource associated with said second semaphore is locked during a portion of said execution of said requested tree operation, wherein said resource associated with said second semaphore is made available during a remaining portion of said execution of said requested tree operation.

20. The system as recited in claim 19, wherein said one or more resources comprises at least one of the following: direct table, list of available leaves to be used, a list of available Pattern Search Control Block's (PSCB's) to be used, address of a leaf, and a list of active leaves in a particular tree, wherein said direct table is a table storing one or more of the following: an address of a leaf and an address of a PSCB.

21. The system as recited in claim 19, wherein said requested tree operation is at least one of the following: insert leaf, update leaf, read leaf and delete leaf.

22. The system as recited in claim 21, wherein during said insert leaf operation said processor further comprises:
   circuitry operable for locking a direct table during said insert leaf operation, wherein said direct table is a table storing one or more of the following: an address of a leaf and an address of a PSCB; and
   circuitry operable for locking a list of available leaves during a portion of said insert leaf operation.

23. The system as recited in claim 22, wherein said second semaphore is associated with an address of said list of available leaves during said insert leaf operation, wherein a first value of said second semaphore indicates to lock said list of available leaves, wherein a second value of said second semaphore indicates to make available said list of available leaves to other threads, wherein said list of available leaves is locked and made available at different times during said insert leaf operation.

24. The system as recited in claim 21, wherein during said update leaf operation said processor further comprises:
   circuitry operable for locking an address of a leaf to be updated during a portion of said update leaf operation.

25. The system as recited in claim 24, wherein said second semaphore is associated with said address of said leaf to be updated during said update leaf operation, wherein a first value of said second semaphore indicates to lock said address of said leaf, wherein a second value of said second semaphore indicates to make available said address of said leaf to other threads, wherein said address of said leaf is locked and made available at different times during said update leaf operation.

26. The system as recited in claim 21, wherein during said read leaf operation said processor further comprises:
   circuitry operable for locking an address of a leaf to be read during a portion of said read leaf operation.

27. The system as recited in claim 26, wherein said second semaphore is associated with said address of said leaf to be read during said read leaf operation, wherein a first value of said second semaphore indicates to lock said address of said leaf, wherein a second value of said second semaphore indicates to make available said address of said leaf to other threads, wherein said address of said leaf is locked and made available at different times during said update leaf operation.

* * * * *